US00RE41646E

(19) United States
(12) Reissued Patent
Ostlund et al.

(10) Patent Number: US RE41,646 E
(45) Date of Reissued Patent: Sep. 7, 2010

(54) CEMENTED CARBIDE BODY WITH INCREASED WEAR RESISTANCE

(75) Inventors: Ake Ostlund, Hagersten (SE); Mats Waldenstrom, Bromma (SE); Ove Alm, Hägersten (SE)

(73) Assignee: Sandvik Intellectual Property Aktiebolag, Sandviken (SE)

(21) Appl. No.: 11/484,834

(22) PCT Filed: Jul. 8, 1997

(86) PCT No.: PCT/SE97/01242

§ 371 (c)(1),
(2), (4) Date: Apr. 1, 1999

(87) PCT Pub. No.: WO98/03690

PCT Pub. Date: Jan. 29, 1998

Related U.S. Patent Documents

Reissue of:
(64) Patent No.: 6,210,632
Issued: Apr. 3, 2001
Appl. No.: 09/214,924
Filed: Apr. 1, 1999

(30) Foreign Application Priority Data

Jul. 19, 1996 (SE) ..... 9602821

(51) Int. Cl.
*B22F 3/12* (2006.01)

(52) U.S. Cl. ..... 419/15; 419/18; 419/35; 419/38

(58) Field of Classification Search ..... 419/15, 419/18, 35, 38
See application file for complete search history.

(56) References Cited

U.S. PATENT DOCUMENTS 5,505,751 A 4/1996 Mehrotra et al.
5,505,902 A 4/1996 Fischer et al.
5,529,804 A 6/1996 Bonneau et al.
5,593,474 A 1/1997 Keshavan et al.
5,624,766 A 4/1997 Moriguchi et al.
5,674,564 A 10/1997 Ljungberg et al.
5,773,735 A 6/1998 Dubensky et al.

OTHER PUBLICATIONS

US 4,966,627, 10/1990, Keshavan et al. (withdrawn)
Derwent WPI, Dialog Accession No. 008183518, WPI Accession No. 90–070519/199010, (Mitsubishi Metal Corp), "Tungsten carbide base hard alloy end mills–cont. cobalt, nickel, chromium, vanadium, titanium carbide, niobium carbide", & JP,A,2022438, 19900125, 199010 B.
Derwent WPI, Dialog Accession No. 007185293, WPI Accession No. 87–182302/198726, (Mitsubishi Metal Corp) "Hot rolling roll of tungsten carbide–based cemented carbide–has excellent toughness and crackling resistance", & JP,A,62112750, 19870523, 198726 B.
Derwent WPPI, Dialog Accession No. 003687589, WPI Accession No. 83–47567K/198320, (Sumitomo Electric Ind Co), "Impact resistant hard alloy–consists of hexagonal molybdenum tungsten carbide (mixed with tungsten carbide) in iron Gp. metal binder phase", & JP,A,58058245, 19830406, 198320 B.
ASM Handbook, vol. 7, Powder Metallurgy, 9th ed., pp. 798801, 1984.*
Derwent WPI, Dialog Accession No. 003687589, WPI Accession No. 83–47567K/198320, (Sumitomo Electric Ind Co), "Impact resistant hard alloy—consists of hexagonal molybdenum tungsten carbide (mixed with tungsten carbide) in iron Gp. metal binder phase", & JP,A,58058245, 19830406, 198320 B.*

* cited by examiner

*Primary Examiner*—Roy King
*Assistant Examiner*—Ngoclan T Mai
(74) *Attorney, Agent, or Firm*—Drinker Biddle & Reath LLP

(57) ABSTRACT

As there is disclosed a cemented carbide body comprising WC with an average grain size of <10 μm in a binder phase. In the cemented carbide body the WC grains can be classified in at least two groups in which a group of smaller grains has a maximum grain size $a_{max}$ and a group of larger grains has a minimum grain size $b_{min}$ and each group contains at least 10 % of the total amount of WC grains. According to the invention $b_{min}-a_{max}>0.5$ μm and the difference in grain size within each group is >1 μm.

14 Claims, No Drawings

CEMENTED CARBIDE BODY WITH INCREASED WEAR RESISTANCE

Matter enclosed in heavy brackets [ ] appears in the original patent but forms no part of this reissue specification; matter printed in italics indicates the additions made by reissue.

*CROSS-REFERENCES TO RELATED APPLICATIONS*

*The present application is a reissue of U.S. Pat. No. 6,210,632 B1, which is a national stage application of PCT/SE97/01242 filed on Jul. 8, 1997, and which claims the benefit of priority to Swedish Application No. 9602812-1 filed Jul. 19, 1996.*

BACKGROUND OF THE INVENTION

The present invention relates to coated cemented carbide bodies particularly useful in tools for turning, milling and drilling of steels and stainless steels.

Cemented carbide bodies are manufactured according to powder metallurgical methods including milling, pressing and sintering. The milling operation is an intensive mechanical milling in mills of different sizes and with the aid of milling bodies. The milling time is of the order of several hours up to days. Such processing is believed to be necessary in order to obtain a uniform distribution of the binder phase in the milled mixture, but it results in a wide WC grain size distribution.

In U.S. Pat. Nos. 5,505,902 and 5,529,804 methods of making cemented carbide are disclosed according to which the milling is essentially excluded. Instead, in order to obtain a uniform distribution of the binder phase in the powder mixture, the hard constituent grains are precoated with the binder phase, the mixture is further wet mixed with pressing agent dried, pressed and sintered. In the first mentioned patent the coating is made by a SOL-GEL method and in the second, a polyol is used.

EP-A-665 308 discloses a coated cutting insert with a bimodal distribution of WC grain size with WC grains in two groups 0.1–1 μm and 3–10 μm. The insert according to this application is produced with conventional milling technique resulting in a broadening of the WC grain size distribution.

OBJECT AND SUMMARY OF THE INVENTION

It is an aspect of this invention to provide a method of making a cemented carbide body comprising wet mixing without milling of at least two different WC-powders with deagglomerated powders of other carbides, binder metal and pressing agent such that the WC-powders are coated with the binder phase, said WC-grains being carefully deagglomerated before and after being coated with binder metal, the grains of the WC-powder being classified in at least two groups in which a group of smaller grains has a maximum grain size $a_{max}$ and a group of a larger grains has a minimum grain size $b_{min}$, each group containing at least 10% of the total amount of WC grains wherein $b_{min}-a_{max}>0.5$ mm, the variation in grain size within each group being >1 μm, drying said mixture, pressing to a desired shape and sintering said pressed bodies.

DETAILED DESCRIPTION OF THE PREFERRED EMBODIMENT OF THE INVENTION

It has now surprisingly been found that a further improvement of the properties of a cemented carbide according to EP-A-665 308 can be obtained it such a material is made using the technique disclosed in the above mentioned U.S. Pat. No. 5,505,902 or 5,529,804.

The present invention relates generally to a cemented carbide body comprising WC with an average grain size of <10 μm in a binder phase. The WC grains are classified in at least two groups in which a group of smaller grains has a maximum grain size $a_{max}$ and a group of larger grains has a minimum grain size $b_{min}$. Each group contains at least 10% of the total amount of WC grains. The cemented carbide body according to the invention is characterized in that $b_{min}-a_{max}>0.5$ μm and that the variation in grain size within each group is >1 μm.

More particularly, the invention relates to a coated cutting insert with a bimodal distribution of the WC grains particularly useful for machining of steels and stainless steels comprising WC and 4–20 wt-% Co, preferably 5–12.5 wt-% Co and 0–30 wt-% cubic carbide, preferably 0–15 wt-% cubic carbide, most preferably 0–10 wt-% cubic carbide such as TiC, TaC, NbC or mixtures thereof. The WC grains have a narrow bimodal grain size distribution with grain sizes in the ranges 0–1.5 μm and 2.5–6.0 μm respectively, and with a weight ratio of fine WC particles (0–1.5 μm) to coarse WC particles (2.5–6.0 μm) in the range of 0.25–4.0, preferably 0.5–2.0.

The amount of W dissolved in the binder phase is controlled by adjustment of the carbon content by small additions of carbon black or pure tungsten powder. The W-content in the binder phase can be expressed as the "CW-ratio" defined as $$\text{CW-ratio}=M_s/(\text{wt \%Co}*0.0161)$$

where $M_s$ is the measured saturation magnetization of the sintered cemented carbide body in [kA/m] *$hAm^2/kg$* and wt % Co is the weight percentage of Co in the cemented carbide. The CW-value in inserts according to the invention shall be 0.82–1.0, preferably 0.86–0.96.

The sintered inserts according to the invention are used coated or uncoated, preferably coated by MTCVD, conventional CVD or PVD, with or without $Al_2O_3$. In particular, multilayer coatings comprising $TiC_xN_yO_z$ with columnar grains followed by a layer of $\alpha$-$Al_2O_3$, $\kappa$-$Al_2O_3$ or a mixture of $\alpha$- and $\kappa$-$Al_2O_3$, have shown good results. In another preferred embodiment, the coating described above is completed with a TiN-layer which can be brushed or used without brushing.

According to the method of the present invention, a cemented carbide body is made comprising wet mixing without milling of at least two different WC-powders with deagglomerated powders of other carbides, generally TiC, TaC and/or NbC, binder metal and pressing agent, dried preferably by spray drying, pressed to inserts and sintered. The grains of the WC-powder are classified in at least two groups in which a group of smaller grains has a maximum grain size $a_{max}$ and a group of larger grains has a minimum grain size $b_{min}$ each group containing at least 10% of the total amount of WC grains wherein $b_{min}-a_{max}>0.5$ μm and the variation in grain size within each group is >1 μm. Preferably, prior to mixing, the WC grains are carefully deagglomerated before and after being coated with binder metal.

Particularly according to the method of the present invention, WC-powders with two narrow grain size distributions of 0–1.5 μm and 2.5–6.0 μm respectively and a weight ratio of fine WC particles (0–1.5 μm) to coarse WC particles (2.5–6.0 μm) in the range of 0.25–4.0, preferably 0.5–2.0 are wet mixed without milling with other carbides generally TiC, TaC and/or NbC, binder metal and pressing agent, dried preferably by spray drying, pressed to inserts and sintered.

It is essential according to the invention that the mixing takes place without milling, i.e., there should be no change in grain size or grain size distribution as a result of the mixing.

In a preferred embodiment, the hard constituents, at least those with narrow grain size distributions, are after careful deagglomeration coated with binder metal using methods disclosed in U.S. Pat. No. 5,505,902 or 5,529,804. In such case, the cemented carbide powder according to the invention is preferably of Co-coated WC+Co-binder, with or without additions of the cubic carbides such as TiC, TaC, NbC, (Ti,W)C, (Ta,Nb)C, (Ti,Ta,Nb)C, (W,Ta,Nb)C, and (W,Ti,Ta,Nb)C coated or uncoated, preferably uncoated, possibly with further additions of Co-powder in order to obtain the desired final composition.

The invention is additionally illustrated in connection with the following Examples which are to be considered as illustrative of the present invention. It should be understood however, that the invention is not limited to the specific details of the Examples.

EXAMPLE 1

A. Cemented carbide tool inserts of the type SEMN 1204 AZ, an insert for milling, with the composition in addition to WC of 8.4 wt % Co, 1.13 wt % TaC and 0.38 wt % NbC were produced according to the invention. Cobalt coated WC, WC-6 wt-% Co, prepared in accordance with U.S. Pat. No. 5,505,902 was carefully deagglomerated in a laboratory jetmill equipment, mixed with additional amounts of Co and deagglomerated uncoated (Ta,Nb)C and TaC powders to obtain the desired material composition. The coated WC-particles consisted of 50 wt % with an average grain size of 3.5 μm and 50 wt % with 1.2 μm average grain size, giving a bimodal grain size distribution. The mixing was carried out in an ethanol and water solution (0.25 l fluid per kg cemented carbide powder) for 2 hours in a laboratory mixer and the batch size was 10 kg. Furthermore, 2 weight-% lubricant, was added to the slurry. The carbon content was adjusted with carbon black to a binder phase alloyed with W corresponding to a CW-ratio of 0.89. After spray drying, the inserts were pressed and sintered according to standard practise and dense structures with no porosity were obtained.

Before coating a negative chamfer with an angle of 20 degrees was ground around the whole insert.

The inserts were coated with a 0.5 μm equiaxed TiCN-layer (with a high nitrogen content corresponding to an estimated C/N-ratio of 0.05) followed by a 4 μm thick TiCN-layer with columnar grains by using the MTCVD-technique (temperature 885–850° C. and $CH_3CN$ as the carbon and nitrogen sources). In subsequent steps during the same coating cycle, a 1.0 μm thick layer of $Al_2O_3$ was deposited using a temperature 970° C. and a concentration of $H_2S$ dopant of 0.4% as disclosed in EP-A-523 021. A thin (0.3 μm) layer of TiN was deposited on top according to known CVD-technique. XRD-measurement showed that the $Al_2O_3$-layer consisted of 100% κ-phase.

The coated inserts were brushed by a nylon straw brush containing SiC grains. Examination of the brushed inserts in a light microscope showed that the thin TiN-layer had been brushed away only along the cutting edge leaving there a smooth $Al_2O_3$-layer surface.

Coating thickness measurements on cross sectioned brush samples showed no reduction of the coating along the edge line except for the outer TiN-layer that was removed.

B. Cemented carbide tool inserts of the type SEMN 1204 AZ, an insert for milling, with the composition 9.1 wt % Co, 1.23 wt % TaC and 0.30 wt % NbC and the rest WC with unimodal distribution and an average grain size of 1.2 μm were produced in the following way. Cobalt coated WC, WC-6 weight-% Co, prepared in accordance with U.S. Pat. No. 5,505,902 was carefully deagglomerated in a laboratory jetmill equipment, mixed with additional amounts of Co and deagglomerated uncoated (Ta,Nb)C and TaC powders to obtain the desired material composition. The mixing was carried out in an ethanol and water solution (0.25 l fluid per kg cemented carbide powder) for 2 hours in a laboratory mixer and the batch size was 10 kg. Furthermore, 2 weight-% lubricant, was added to the slurry. The carbon content was adjusted with carbon black to a binder phase highly alloyed with W corresponding to a CW-ratio of 0.89. After spray drying, the inserts were pressed and sintered according to standard practise and dense structures with no porosity were obtained.

Before coating a negative chamfer with an angle of 20 degrees was ground around the whole of each insert.

The inserts were coated in the same coating batch as the inserts A above.

The coated inserts were brushed by a nylon straw brush containing SiC grains. Examination of the brushbed inserts in a light microscope showed that the thin TiN-layer had been brushed away only along the cutting edge leaving there a smooth $Al_2O_3$-layer surface.

Coating thickness measurements on cross sectioned brushed samples showed no reduction of the coating along the edge line except for the outer TiN-layer that was removed.

C. Cemented carbide tool inserts of the type SEMN 1204 AZ with the same chemical composition, average grain size of WC, CW-ratio, chamfering, CVD-coating and brushing respectively as the insert B above but produced from powder manufactured with conventional ball milling techniques were used as reference for comparison with the test specimens according to above.

Inserts from A, B and C were compared in a wet milling test in a rather highly alloyed steel (HB=310). Two parallel bars each of a thickness of 35 mm were centrally positioned relative the cutter body (diameter 100 mm ), and the bars were placed with an air gap of 10 mm between them.

The cutting data were:

Speed=150 m/min

Feed=0.40 mm/rev

Cutting depth 2 mm, single tooth milling with coolant.

Evaluated tool life expressed as cutting length of variant A according to the invention was 8200 mm and for variant B 6900 mm and finally for the standard variant C only 6100 mm. In this test the insert according to the invention with a bimodal WC grain size distribution, variant A, obtained the best result.

EXAMPLE 2

A. Inserts from the same batch as insert A in Example 1 above and

B. Inserts from the same batch as insert B in Example 1 above and

C. Inserts from the same batch as insert C in Example 1 above were compared in a wet milling test in a low alloyed steel (SS 1650, HB=180). Two parallel bars each of a thickness 30 mm were centrally positioned relative the cutter body (diameter 100 mm). The bars were placed with an air gap of 10 mm between them.

The cutting data were:

Speed=285 m/min

Feed=0.38 mm/rev

Cutting depth 2 mm, single tooth milling with coolant.

Evaluated tool life expressed as cutting length of variant A according to the invention was 4800 mm and for variant B, 4200 mm and finally for the standard variant C only 3600 mm. In this test the insert according to the invention with a bimodal WC grain size distribution, variant A, performed best.

The principles, preferred embodiments and modes of operation of the present invention have been described in the foregoing specification. The invention is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of making a cemented carbide body comprising wet mixing without milling of at least two different WC-powders with deagglomerated powders of other carbides and a binder metal such that the [WC-powers] *WC-powders* are coated with the binder phase, said WC-grains being deagglomerated before and after being coated with binder metal, the grains of the WC-powder being classified in at least two groups in which a group of smaller grains has a maximum grain size $a_{max}$ and a group of larger grains has a minimum grain size $b_{min}$, each group containing at least 10% of the total amount of WC grains wherein $b_{min}-a_{max}>0.5$ [mm] *μm*, the variation in grain size within each group being >1 μm, drying said mixture, pressing to a desired shape and sintering said pressed bodies.

2. The method of claim 1 wherein said other carbides comprise one or more of TiC, TaC and NbC.

3. The method of claim 1 wherein said sintered bodies are coated with an $Al_2O_3$ layer.

4. The method of claim 1 wherein said two groups of WC-powder have grain size distributions of 0–1.5 μm and 2.5–6.0 μm, respectively.

5. The method of claim 4 wherein the weight ratio of particles with a grain size distribution of 0–1.5 μm to 2.5–6.0 μm is from 0.25 to 4.0.

6. The method of claim 5 wherein said weight ratio is from 0.5–2.0.

*7. The method of claim 1 wherein said sintered bodies have a CW-ratio of 0.82–1.0.*

*8. The method of claim 7 wherein said CW-ratio is 0.86–0.96.*

*9. The method of claim 3 wherein said sintered bodies have a CW-ratio of 0.82–1.0.*

*10. The method of claim 9 wherein said CW-ratio is 0.86–0.96.*

*11. The method of claim 4 wherein said sintered bodies have a CW-ratio of 0.82–1.0.*

*12. The method of claim 11 wherein said CW-ratio is 0.86–0.96.*

*13. The method of claim 5 wherein said sintered bodies have a CW-ratio of 0.82–1.0.*

*14. The method of claim 13 wherein said CW-ratio is 0.86–0.96.*

* * * * *